(12) United States Patent
Burrell

(10) Patent No.: US 9,123,045 B2
(45) Date of Patent: Sep. 1, 2015

(54) PREDICTIVE GEOLOCATION BASED RECEIPT RETRIEVAL FOR POST TRANSACTION ACTIVITY

(71) Applicant: BANK OF AMERICA CORPORATION, Charlotte, NC (US)

(72) Inventor: Charles Jason Burrell, Middleburg, FL (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 13/886,114

(22) Filed: May 2, 2013

(65) Prior Publication Data

US 2014/0326783 A1   Nov. 6, 2014

(51) Int. Cl.
*G06K 7/00* (2006.01)
*G06Q 30/00* (2012.01)

(52) U.S. Cl.
CPC ..................................... *G06Q 30/01* (2013.01)

(58) Field of Classification Search
USPC .................. 235/375, 380, 383; 705/5, 35–45
See application file for complete search history.

(56) References Cited

U.S. PATENT DOCUMENTS

| 5,642,279 | A | 6/1997 | Bloomberg et al. |
| 7,379,922 | B2 | 5/2008 | Pericle |
| 7,428,988 | B1 | 9/2008 | Starr |
| 7,637,426 | B1 | 12/2009 | Green |
| 7,740,172 | B1 | 6/2010 | Hubert et al. |
| 7,941,344 | B1 | 5/2011 | Bickerstaff |
| 8,006,900 | B2 | 8/2011 | Grigsby et al. |
| 8,046,260 | B2 | 10/2011 | Haddad et al. |
| 8,096,470 | B2 | 1/2012 | Mink |
| 8,180,682 | B2 | 5/2012 | Narayanaswami et al. |
| 2003/0055733 | A1 | 3/2003 | Marshall et al. |
| 2006/0265339 | A1 | 11/2006 | Vakil et al. |
| 2007/0095892 | A1 | 5/2007 | Lyons et al. |
| 2008/0162268 | A1* | 7/2008 | Gilbert ............................ 705/10 |
| 2009/0192892 | A1 | 7/2009 | Cason |
| 2010/0151821 | A1 | 6/2010 | Sweeney et al. |
| 2012/0215615 | A1 | 8/2012 | Moredock |
| 2012/0330971 | A1* | 12/2012 | Thomas et al. ............... 707/748 |
| 2013/0006742 | A1* | 1/2013 | Richard ..................... 705/14.25 |

\* cited by examiner

*Primary Examiner* — Matthew Mikels
(74) *Attorney, Agent, or Firm* — Michael A. Springs; Moore & Van Allen PLLC; Nicholas C. Russell

(57) ABSTRACT

In general, embodiments of the invention are directed to a system, method, or computer program product for providing a user with a predictive geo-location based receipt retrieval for post transaction action. Consumers receive e-receipts after handling a transaction with a merchant in many ways. These receipts can be stored and managed with considerably ease over physical receipts. Consumers may use these receipts after making a purchase for post transaction actions such as product return, product refund, warranty services, and/or the like. The present invention may be used to retrieve the receipts based on the consumer's geographic location, predicting a post transaction action scenario.

19 Claims, 5 Drawing Sheets

Figures 4A, 4B:
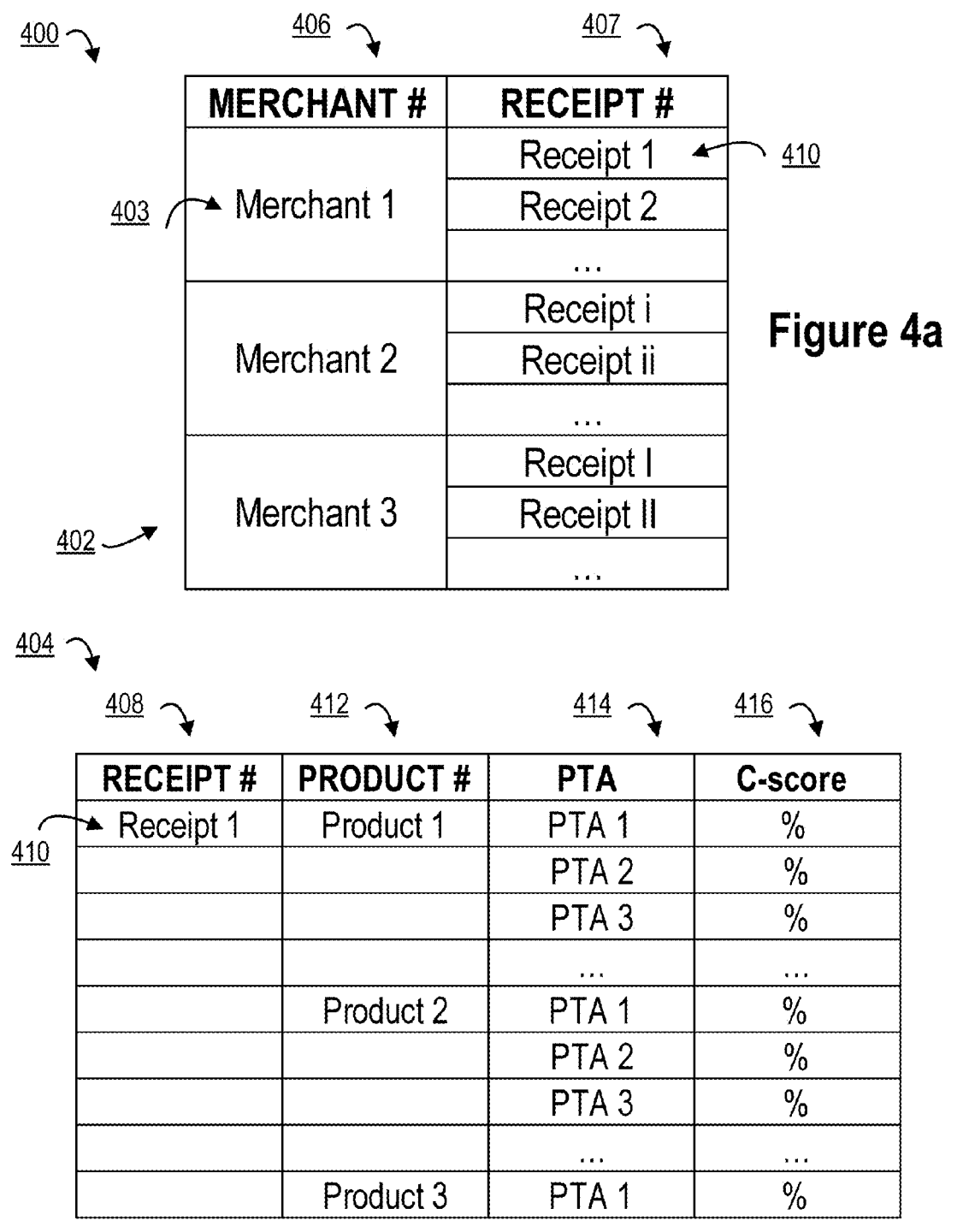

400

406

407

| MERCHANT # | RECEIPT # |
|---|---|
| Merchant 1 | Receipt 1 |
|  | Receipt 2 |
|  | ... |
| Merchant 2 | Receipt i |
|  | Receipt ii |
|  | ... |
| Merchant 3 | Receipt I |
|  | Receipt II |
|  | ... |

| RECEIPT # | PRODUCT # | PTA | C-score |
|---|---|---|---|
| Receipt 1 | Product 1 | PTA 1 | % |
|  |  | PTA 2 | % |
|  |  | PTA 3 | % |
|  |  | ... | ... |
|  | Product 2 | PTA 1 | % |
|  |  | PTA 2 | % |
|  |  | PTA 3 | % |
|  |  | ... | ... |
|  | Product 3 | PTA 1 | % |

PREDICTIVE GEOLOCATION BASED RECEIPT RETRIEVAL FOR POST TRANSACTION ACTIVITY

BACKGROUND

Consumers receive receipts as evidence for their transaction with merchants. Typically, a merchant provides a consumer with a paper receipt at the point of transaction (POT). In the current market place, in addition to paper receipts, the consumer may request an electronic receipt (e-receipt) for every transaction. Such e-receipts can be stored, organized, transmitted, and generally managed with considerable convenience over physical paper receipts.

Consumers may use these receipts (both e-receipts and paper receipts) post transaction for various purposes such as product return, product refund, warranty claims, or the like. In such situations, the consumer may have to search through a myriad of receipts to identify the receipt for the product that has to be returned or refunded.

BRIEF SUMMARY

Embodiments of the present invention addresses the above needs and/or achieve other advantages by providing apparatuses (e.g., a system, computer program product and/or other devices) and methods for providing predictive receipt retrieval for product returns. As such, after a user has completed a transaction with a merchant, the system may receive a receipt associated with the transaction. Typically, the receipt is an electronic receipt (e-receipt). The e-receipt may provide the system with information about the transaction, such as, but not limited to the merchant of the transaction, a payment vehicle used for the transaction, information associated with the products of the transaction, a purchase price of each product of the transaction, and the like.

In some embodiments, the e-receipt may be used to identify merchant information, product information, transaction information, and/or the like. In some embodiments, product information may include a product code, which is at least one of a stock keeping unit (SKU) code, a universal product code (UPC), an international article number (EAN), a global trade item number (GTIN), a quick response (QR) code, and/or the like associated with the receipt. In some embodiments, the merchant information may include merchant name, merchant location, and/or the like. In some embodiments, the transaction information may include transaction price, method of payment, and/or the like.

Purchased products are often associated with one or more post transaction action such as product return services, product refund services, warranty services, and/or the like. In some embodiments, purchased products may often be returned to the merchant for a variety of reasons, such as, unsatisfactory product performance, negative feedback, buyer's remorse, undesirable gifts, and/or the like. In some other embodiments, purchased products may require other services such as warranty service, and/or an upgrade service post transaction. In one aspect, the products purchased by the consumer may have post transaction action policies that define the conditions for providing a post transaction service such as a return service. An exemplary post transaction policy for one merchant dictates conditions for policy return. For example, the merchant may not accept any returns or exchanged items: if any of the tags have been removed totally and then re-attached; if the goods are not in their original condition; if the garment has been used, worn, and/or washed; if the garment was purchased more than 14 days before the date of return; or the like. In some embodiments, the post transaction action policy associated with a product may be retrieved from the information in the receipt. In some embodiments, the user may have to return to the point of transaction to handle the post transaction action. In some embodiments, the user may handle the post transaction action at any other transaction location of the same merchant.

In some embodiments, the system may receive an indication of the geographic location associated with the user. In one aspect, the geographic location may be a geo-fence, wherein a geo-fence is a dynamically generated radius around the user's location. Typically this is done when the user initiates an application associated with the system on a mobile device (e.g., smartphone, tablet) capable of network connectivity. In some other embodiments, the system may prompt the user to manually enter the information associated with the geographic location such as an address.

In one aspect, the system may identify one or more merchants relative in location of the geographic parameters of the user, anticipating potential post transaction action scenarios. In one aspect, the system may retrieve one or more receipts from the one or more merchants identified and the one or more merchants at multiple other transaction locations. In some embodiments, the system may retrieve one or more products from one or more receipts for a post transaction action. In one aspect, the system may identify one or more products for post transaction action based on the post transaction action policy. The post transaction action policy may be dictated by the merchant, by the manufacturer, or the like. The post transaction action policy provides an indication as to whether a product of a transaction may be returnable/exchangeable within a given time period post-transaction.

In some embodiments, the system may then determine a confidence score associated with one or more products in the receipts predicting the possibility of post transaction action and may categorize the identified one or more products based on the confidence score. In this way, the user may be presented with a list of products that may be eligible for post transaction action at a merchant. In some embodiments, this list may list the most likely product to be returned/exchanged based on the confidence score first. This categorized product list may be presented to the user for further action.

Optionally, the user may "flag" or manually indicate one or more products for at least one of a post transaction action. Typically, when at least one of the post transaction actions are executed at a merchant transaction location, the system receives a receipt associated with the post transaction action and stores the receipt from the post transaction action with the receipt from the initial transaction between the user and the merchant.

Embodiments of the invention relate to systems, methods, and computer program products for predicting geo-location based receipt retrieval for post transaction activity, comprising receiving a receipt from a transaction between a user and a merchant; receiving an indication of geographic location of the user; identifying one or more merchants relative in location to the geographic location of the user based at least in part on the indication of the geographic location of the user; retrieving receipts from transactions between the one or more identified merchants and the user; identifying one or more products of the transactions between the one or more identified merchants and the user based at least in part on the retrieved receipts from transactions between the one or more identified merchants and the user; determining if the one or more products identified can be associated with a post transaction action based on at least one of a post transaction policy associated with the one or more products identified; determining a confidence score for the one or more products identified, wherein the confidence score predicts the possibility of post transaction action; categorizing the one or more identified products based at least in part on the confidence score predicting the possibility of potential post transaction action; and presenting list of one or more products identified in order of categorization to the user.

In some embodiments, identifying one or more products of the transaction further comprises identifying: product information, wherein product information comprises a stock-keeping unit (SKU) number and post transaction action policy; merchant information, wherein merchant information comprises merchant name and merchant location; or transaction information, wherein transaction information comprises transaction amount.

In some embodiments, the invention further comprises identifying one or more merchants relative in location to the geographic location of the user is based on received receipts for the transactions between the user and the one or more merchants identified.

In some embodiments, the geographic location of the user is determined by a geo-location parameter, wherein the geo-location parameters comprise a geo-fence defining a virtual perimeter around a geographic location.

In some embodiments, retrieving receipts from transactions between one or more merchants identified further comprises: identifying one or more merchants relative in location to the geographic location of the user; and determining that the user has not transacted with the one or more merchants relative in location to the geographic location of the user; determining if the user has transacted with the same one or more merchants identified at other locations; identifying one or more products of the transactions between the user and the same one or more merchants identified at other locations.

In some embodiments, the invention further comprises storing the receipt from the one or more post transaction actions with the receipt from transactions between the user and the one or more merchants identified.

In some embodiments, determining a confidence score for the one or more products identified further indicates the probability that the one or more products identified may be associated with at least one of a post transaction action.

In some embodiments, the one or more identified products based at least in part on the confidence score predicting the possibility of potential post transaction action further comprises ranking the products from the highest confidence score to the lowest confidence score.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
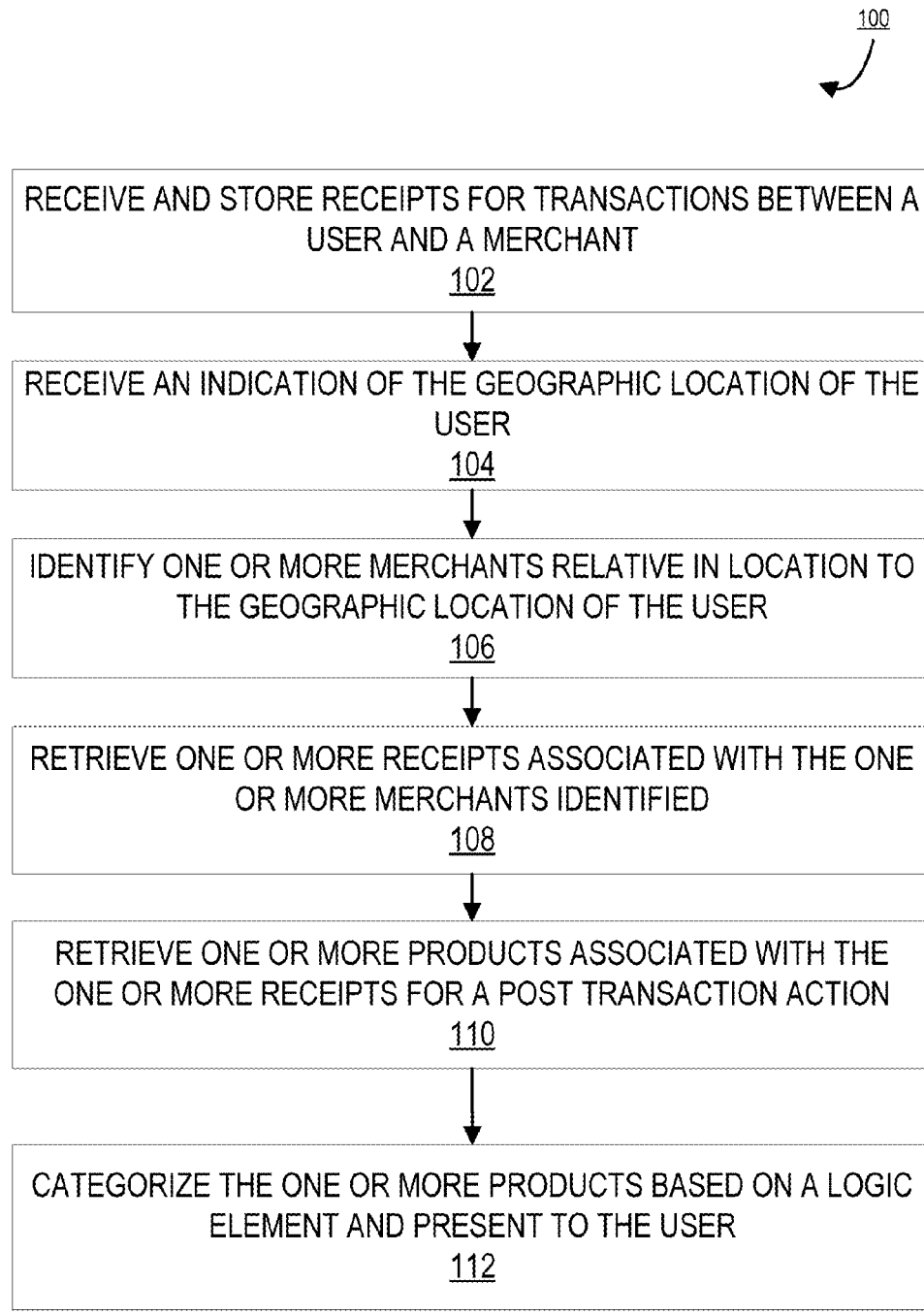
Figure 2:
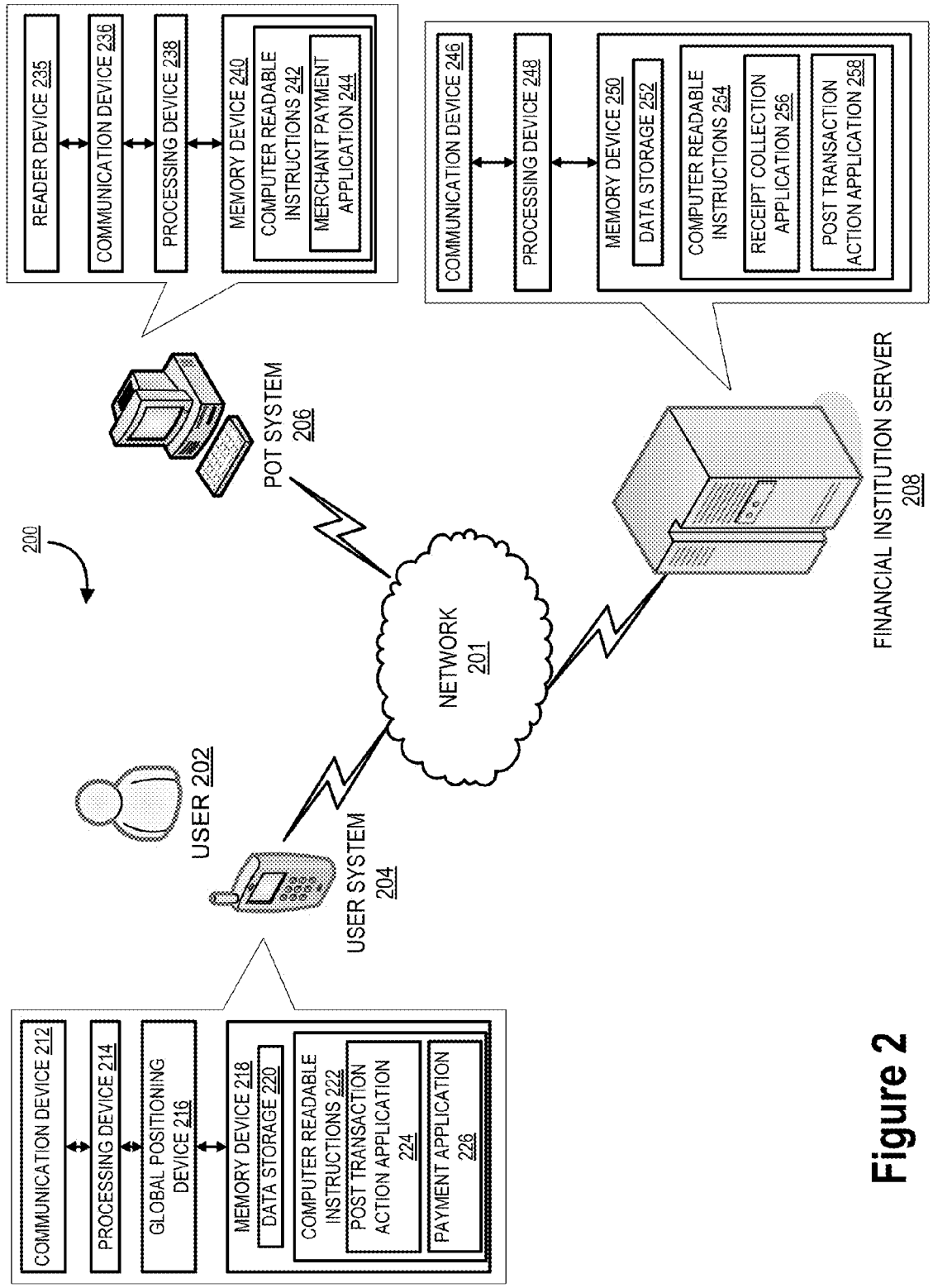
Figure 3:
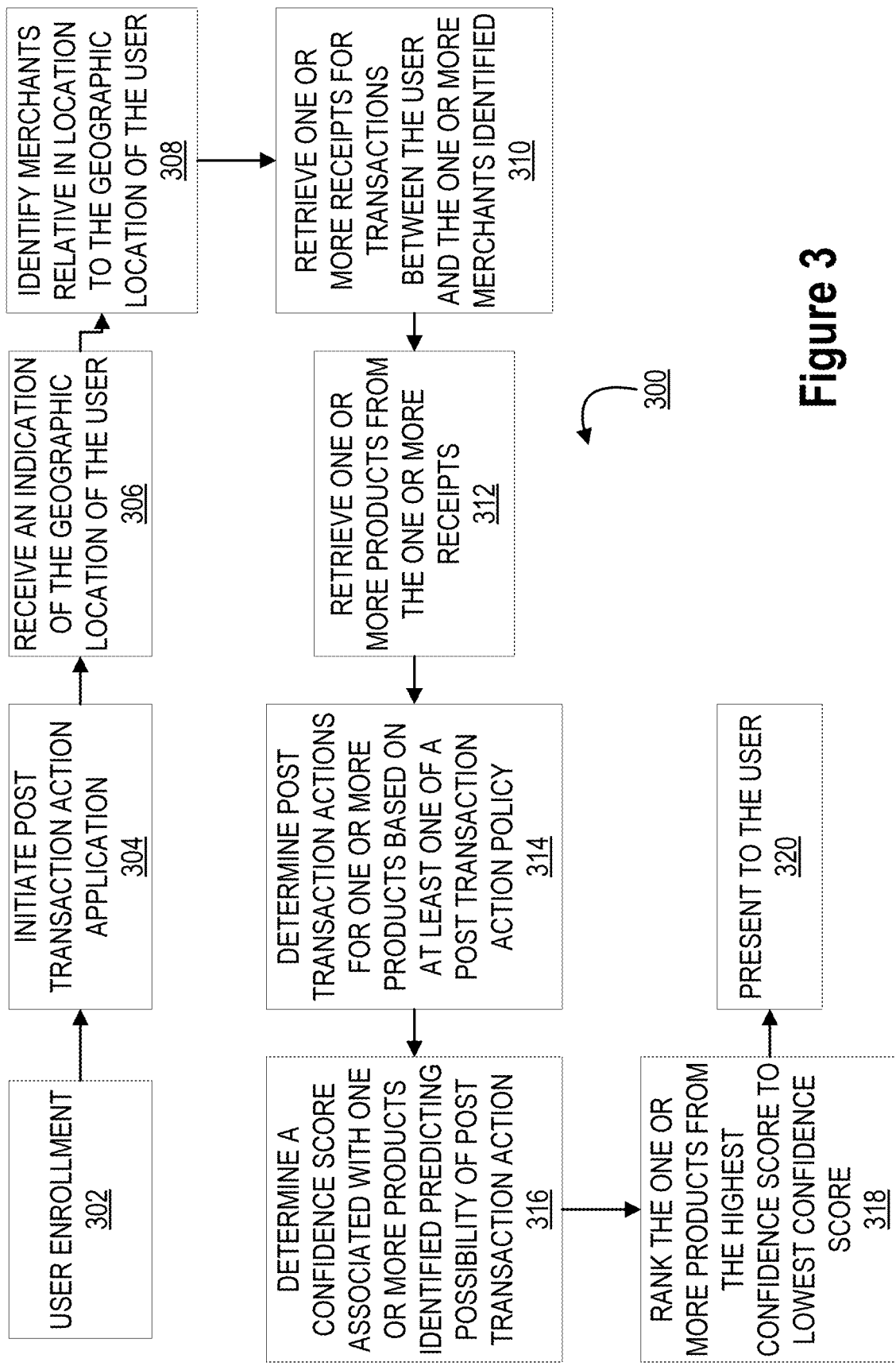
Figure 5:
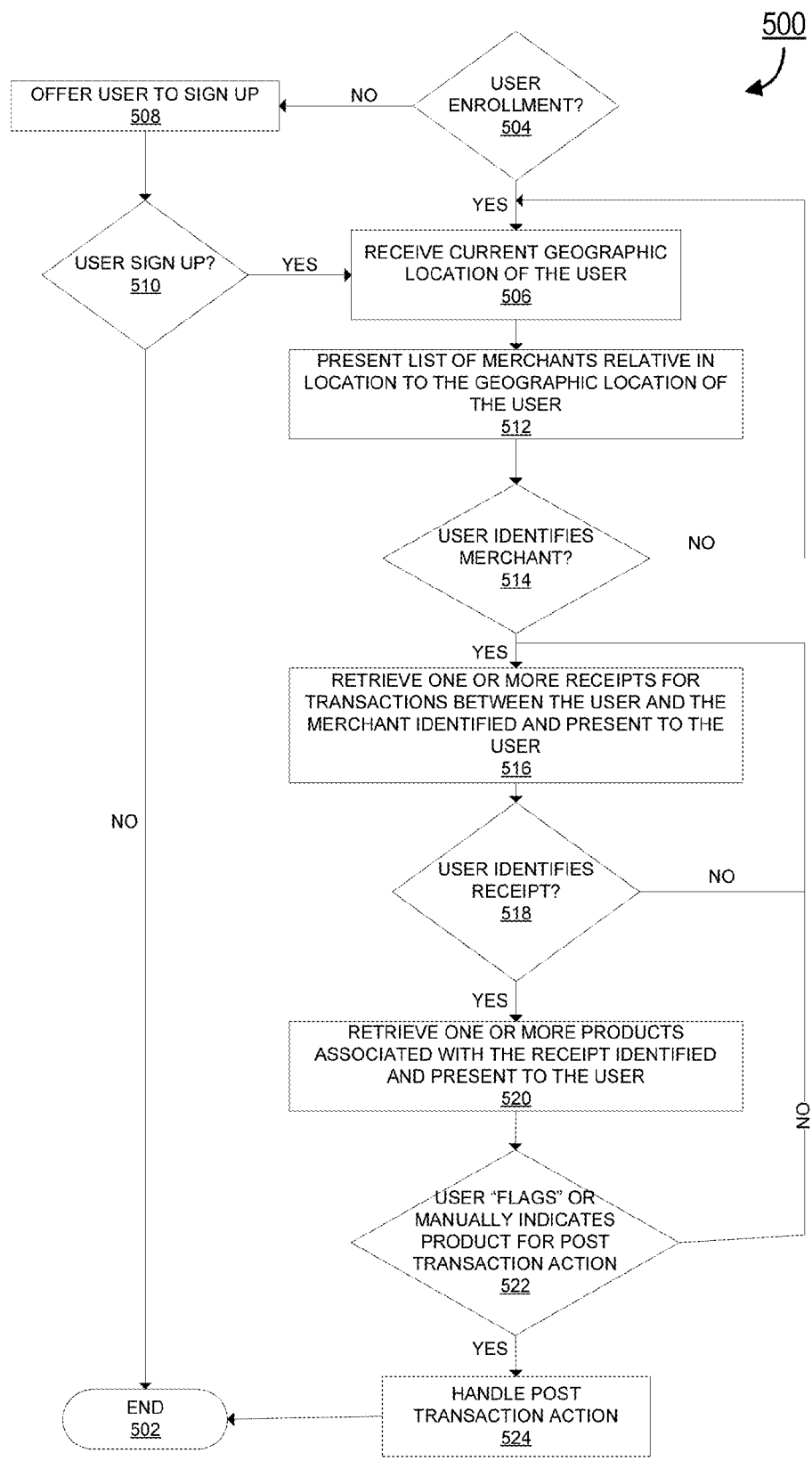

Having thus described embodiments of the invention in general terms, reference will now be made to the accompanying drawings, wherein:

FIG. 1 provides a high level process flow illustrating predictive geo-location based receipt retrieval for post transaction action, in accordance with one embodiment of the present invention;

FIG. 2 provides a illustrating a system environment for predictive geo-location based receipt retrieval for post transaction action, in accordance with one embodiment of the present invention;

FIG. 3 provides a process map illustrating the process of predicting a post transaction action based on the geographic location of the user, in accordance with one embodiment of the present invention;

FIG. 4a illustrates an example embodiment of the categorized product list presented to the user for further action, in accordance with one embodiment of the present invention;

FIG. 4b illustrates an example embodiment of the categorized product list presented to the user for further action, in accordance with one embodiment of the present invention; and FIG. 5 illustrates a flow chart of the user accessing the post transaction action application, in accordance with one embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

The term "merchant" as used herein may include any vendor, service provider, manufacturer, product provider, warehouse, auction house, or the like that provides goods or services to a user. The term "user" as used herein may include an individual, a group of individuals, a company, or any entity that may be involved in a transaction with the merchant. The term "receipt" as used herein may include an electronic receipt (e-receipt), a physical or paper receipt, or any form of evidence provided to the user for a transaction. The term "product" as used herein may include any product, service, or the like that may be purchased or obtained from a merchant. Furthermore, the term "payment vehicle" or "payment account" as used herein may include any method of payment for purchasing a product or service. Payment vehicles may include, but are not limited to cash, credit cards, debit cards, lines of credit, checks, debit notes, payment accounts, fund accounts, or the like. The term "product" as used herein may include any product, service, or the like that may be purchased or obtained from a merchant.

Although some embodiments of the invention herein are generally described as involving a "financial institution," one of ordinary skill in the art will appreciate that other embodiments of the invention may involve other businesses that take the place of or work in conjunction with the financial institution to perform one or more of the processes or steps described herein as being performed by a financial institution. Still in other embodiments of the invention the financial institution described herein may be replaced with other types of businesses that offer payment account systems to users. Some portions of this disclosure are written in terms of a financial institution's unique position with respect to user transactions. As such, a financial institution may be able to utilize its unique position to receive, store, process, and retrieve information associated with transactions.

The embodiments described herein may refer to the use of a transaction, transaction event or point of transaction event to trigger the steps, functions, routines, or the like described herein. In various embodiments, occurrence of a transaction triggers the sending of information such as offers and the like. Unless specifically limited by the context, a "transaction", "transaction event" or "point of transaction event" refers to any communication between the user and the merchant, e.g. financial institution, or other entity monitoring the user's activities. In some embodiments, for example, a transaction may refer to a purchase of goods or services, a return of goods or services, a payment transaction, a credit transaction, or other interaction involving a user's bank account.

As used herein, a "bank account" refers to a credit account, a debit/deposit account, or the like. Although the phrase "bank account" includes the term "bank," the account need not be maintained by a bank and may, instead, be maintained by other financial institutions. For example, in the context of a financial institution, a transaction may refer to one or more of a sale of goods and/or services, an account balance inquiry, a rewards transfer, an account money transfer, opening a bank application on a user's computer or mobile device, a user accessing their e-wallet or any other interaction involving the user and/or the user's device that is detectable by the financial institution. As further examples, a transaction may occur when an entity associated with the user is alerted via the transaction of the user's location. A transaction may occur when a user accesses a building, uses a rewards card, and/or performs an account balance query. A transaction may occur as a user's mobile device establishes a wireless connection, such as a Wi-Fi connection, with a point-of-sale (or point-of-transaction) terminal. In some embodiments, a transaction may include one or more of the following: purchasing, renting, selling, and/or leasing goods and/or services (e.g., groceries, stamps, tickets, DVDs, vending machine items, and the like); withdrawing cash; making payments to creditors (e.g., paying monthly bills; paying federal, state, and/or local taxes and/or bills; or the like); sending remittances; transferring balances from one account to another account; loading money onto stored value cards (SVCs) and/or prepaid cards; donating to charities; and/or the like.

In some embodiments, the transaction may refer to an event and/or action or group of actions facilitated or performed by a user's device, such as a user's mobile device. Such a device may be referred to herein as a "point-of-transaction device". A "point-of-transaction" could refer to any location, virtual location or otherwise proximate occurrence of a transaction. A "point-of-transaction device" may refer to any device used to perform a transaction, either from the user's perspective, the merchant's perspective or both. In some embodiments, the point-of-transaction device refers only to a user's device, in other embodiments it refers only to a merchant device, and in yet other embodiments, it refers to both a user device and a merchant device interacting to perform a transaction. For example, in one embodiment, the point-of-transaction device refers to the merchant's transaction system with applications that facilitate a transaction, whereas in other embodiments, the point-of-transaction device refers to the merchant's point of sale terminal configured to communicate with a user's mobile device, and in yet other embodiments, the point-of-transaction device refers to both the user's mobile device and the merchant's point of sale terminal configured to communicate with each other to carry out a transaction.

In some embodiments, a point-of-transaction device is or includes an interactive computer terminal that is configured to initiate, perform, complete, and/or facilitate one or more transactions. A point-of-transaction device could be or include any device that a user may use to perform a transaction with an entity, such as, but not limited to, an ATM, a loyalty device such as a rewards card, loyalty card or other loyalty device, a magnetic-based payment device (e.g., a credit card, debit card, or the like), a personal identification number (PIN) payment device, a contactless payment device (e.g., a key fob), a radio frequency identification device (RFID) and the like, a computer, (e.g., a personal computer, tablet computer, desktop computer, server, laptop, or the like), a mobile device (e.g., a smartphone, cellular phone, personal digital assistant (PDA) device, MP3 device, personal GPS device, or the like), a merchant terminal, a self-service machine (e.g., vending machine, self-checkout machine, or the like), a public and/or business kiosk (e.g., an Internet kiosk, ticketing kiosk, bill pay kiosk, or the like), a gaming device, and/or various combinations of the foregoing.

In some embodiments, a point-of-transaction device is operated in a public place (e.g., on a street corner, at the doorstep of a private residence, in an open market, at a public rest stop, or the like). In other embodiments, the point-of-transaction device is additionally or alternatively operated in a place of business (e.g., in a retail store, post office, banking center, grocery store, factory floor, or the like). In accordance with some embodiments, the point-of-transaction device is not owned by the user of the point-of-transaction device. Rather, in some embodiments, the point-of-transaction device is owned by a mobile business operator or a point-of-transaction operator (e.g., merchant, vendor, salesperson, or the like). In yet another embodiment, the point-of-transaction device is owned by the financial institution offering the point-of-transaction device providing functionality in accordance with embodiments of the invention described herein.

Typically, the system receives an indication of a transaction being completed between a merchant and a user. In response to a completed transaction, the system may receive a receipt for the transaction between the user and the merchant. In some embodiments, the system may automatically receive the receipt from the merchant. In some embodiments, the system may request the receipt from the merchant. In some embodiments, the system may request the receipt from the user. In yet another embodiment, the user may manually provide the receipt to the system.

FIG. 1 provides a high level process flow for a predictive geo-location based receipt retrieval for product returns 100, in accordance with one embodiment of the present invention. At block 102, the process first receives and stores receipts for transactions between a user and a merchant. Next, as illustrated in block 104 the process 100 continues to receive an indication of the geographic location of the user. Typically, the geographic location is a geo-location parameter defining the real-world geographic location of the user. In some embodiments, the system may utilize mapping displays or other geographic information system (GIS) to present geographical data. Once the geographic location of the user is determined, the process continues by identifying one or more merchants relative in location to the geographic location of the user, as illustrated in block 106.

Next, as illustrated in block 108, the next step is to retrieve one or more receipts associated with the one or more merchants identified. In some embodiments, the system comprises retrieving one or more receipts from the one or more merchants identified at multiple other transaction locations where the user may have purchased a product. For example, the user may have purchased one or more products from the same merchant located at multiple transaction locations. The system retrieves the one or more products purchased from the same merchant at multiple other locations anticipating potential refund/return scenario, if the location of the one or more transaction locations of the merchant is relative in location of the user's geographic location. Next, as illustrated in block 110, the process 100 retrieves one or more products from the one or more receipts, anticipating potential post transaction action scenario. Finally, at block 112, the process continues by categorizing the one or more products based on a logic element and presenting to the user.

FIG. 2 provides a system environment for predictive geo-location based receipt retrieval for post transaction action 200, in accordance with one embodiment of the present invention. As illustrated in FIG. 2, the financial institution server 208 is operatively coupled, via a network 201 to the user system 204, and to the point-of-transaction (POT) system 206. In this way, the financial institution server 208 can send information to and receive information from the user system 204, and the POT system 206. FIG. 2 illustrates only one example of an embodiment of a system environment for predictive geo-location based receipt retrieval for post transaction action 200, and it will be appreciated that in other embodiments one or more of the systems, devices, or servers may be combined into a single system, device, or server, or be made up of multiple systems, devices, or servers.

The network 201 may be a global area network (GAN), such as the Internet, a wide area network (WAN), a local area network (LAN), or any other type of network or combination of networks. The network 201 may provide for wired, wireless, or a combination wired and wireless communication between devices on the network 201.

In some embodiments, the user 202 is an individual initiating a financial transaction. The financial transaction may be made at a POT system 206 of a merchant, online or offline, over the phone, at the merchant's place of business and/or other transaction means. The purchase may be made by the user 202 using a user system 204, such as a mobile wallet (i.e. smart phone, PDA, and the like) or other types of payment systems that communicate with POT systems 206 and/or financial institution servers. In some embodiments, the user 202 may be a merchant or a person, employee, agent, independent contractor, and the like acting on behalf of the merchant to enter into a transaction.

As illustrated in FIG. 2, the financial institution server 208 generally comprises a communication device 246, a processing device 248, and a memory device 250. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 248 is operatively coupled to the communication device 246 and the memory device 250. The processing device 248 uses the communication device 246 to communicate with the network 201 and other devices on the network 201, such as, but not limited to the POT system 206, and the user system 204. As such, the communication device 246 generally comprises a modem, server, or other device for communicating with other devices on the network 201.

As further illustrated in FIG. 2, the financial institution server 208 comprises computer-readable instructions 254 stored in the memory device 250, which in one embodiment includes the computer-readable instructions 254 of a receipt collection application 256. In some embodiments, the computer-readable instructions 254 include a post transaction action application 258. In some embodiments, the memory device 250 includes data storage 252 for storing data related to the system for predictive geo-location based receipt retrieval for post transaction action including but not limited to data created and/or used by the receipt collection application 256 and/or the post transaction action application 258 that determines possibility of post transaction action.

As illustrated in FIG. 2, the financial institution server 208 comprises a post transaction action application 258. Initially, the post transaction action application 258 may identify a user 202 enrollment into the process. Once enrolled, the post transaction action application 258 may be initiated by the user 202 by utilizing his/her user system 204. In some embodiments, the post transaction action application 258 in the financial institution server 208 may receive the geographic location of the user 202 automatically when initiated. Typically, the geographic location is identified by the global positioning device 216 in the user system 204 and transmitted, via the network 201, to the financial institution server 208. The financial institution server 208 may receive the geographic location via the communication device 246. In some embodiments, the post transaction action application 258 may manually require the user 202 to input the geographic location such as an address. In one aspect, the geographic location comprises a geo-location parameter to identify a real-world geographic location of the user 202. In another aspect, the geographic location comprises a geo-fencing parameter, dynamically generating a radius around a point of location, such as a shopping center, a strip mall, and/or areas with multiple merchants. In one aspect, the geo-fence may be a circular boundary surrounding a geographic area. In another aspect, the geo-fence may be a polygon. Typically, when the user 202 enters or exits a geo-fence, the post transaction action application 258 can be configured to receive notification comprising the location of the user 202 through the network 201.

In some embodiments, the merchant may have a store-within-a-store (SWAS) agreement with one or more merchants. A SWAS is an agreement in which a merchant rents a part of the retail space to be used by a different merchant, to run an independent store. In other embodiments, there may be multiple merchants within the same geo-location as each other. As such, in either event, some times more than one merchant may have the same geo-fence parameter. In some embodiments, the post transaction action application 258 may identify one or more geo-fence parameters relative in location to the geographic location of the user 202, enabling the user 202 to choose a geo-fence parameter from a list of geo-fence parameters provided.

In response to receiving the geographic location of the user 202 from the user system 204, the post transaction action application 258 may identify via the network 201, one or more merchants relative in location to the geographic location of the user 202. As such, the post transaction action application 258 may determine the classification of the one or more merchants, such as a department store, grocery store, gas station, or the like. Furthermore, the post transaction action application 256 may determine the store name, such as Gas Station 1 or Department Store 2.

As further illustrated in FIG. 2, the financial institution server comprises a receipt collection application 256. The receipt collection application 256 receives via a communication device 246, receipts for transactions between the user 202 and the merchant. In response to receiving the receipt, the receipt collection application 256 may store the receipts in data storage 252 for future use. In some embodiments, the receipt collection application 256 may receive an electronic copy of the receipt for transactions between the user 202 and the merchant. In one aspect, the receipt collection application 256 may retrieve at least one of a product information, merchant information, post transaction action policy, and/or the like from the electronic receipt received and store the information in the data storage 252. In another aspect, the receipt collection application 256 may store the electronic copy of the receipt in the data storage 252 and retrieve the information when required.

In response to identifying one or more merchants relative in location to the geographic location of the user 202, the post transaction action application 258 may anticipate at least one of potential post transaction action such as product return service, product refund service, warranty service, and/or the like associated with the one or more products purchased by the user 202 from the one or more merchants identified. In some embodiments, the post transaction action application 258 may request one or more receipts associated with one or more merchants identified from the receipt collection application 256. In response to receiving a request from the post transaction action application, the receipt collection application 256 may retrieve from the data storage 252, one or more receipts associated with one or more merchants identified. In response to receiving the one or more receipts associated with the one or more merchants identified from the receipt collection application 256, the post transaction application 258 may retrieve one or more products from the one or more receipts associated with the one or more merchants identified. In one aspect, the one or more products may be purchased from the one or more merchants identified, at multiple other transaction locations. For example, the user 202 may have purchased products P1, P2, and P3, from Merchant 1 at Location 1. After initial use, the user 202 may be unsatisfied with the performance of the product P1 purchased from Merchant 1, and may decide to return it. In such cases, the user 202 need not return the product P1 to Merchant 1 located at Location 1. The user 202 may return the product P1 to any of the multiple other locations of Merchant 1 with post transaction action capability.

In response to retrieving one or more products from one or more receipts from the receipt collection application 256, the post transaction action application 258 may determine if at least one of the potential post transaction actions may be possible for one or more products from the receipt based on at least one of a post transaction action policy. In some embodiments, the post transaction action policy may be defined by the merchant. In some other embodiments, the post transaction action policy may be defined by the original manufacturer. In yet another embodiment, the merchant and manufacturer may be the same entity. For example, electronic equipment such as a television, a DVD player, or the like, may have a return period of 90 days; products such as books, movies, music, and video games may have a return policy based on whether they have been used or remain unused at the time of the return.

In response to determining if at least one of the potential post transaction actions may be possible for one or more products from the receipt based on at least one of a post transaction action policy, the post transaction action application 258 may determine a confidence score predicting the possibility post transaction action.

In some embodiments, the post transaction action application 258 may rank the products from the highest confidence score to the lowest confidence score, where products with high confidence score are highly likely to be associated with a post transaction action based on geographic location of the user, merchant identified, product information, and/or the like. The list is then presented to the user 202, via the network 201, for further action. In response to receiving a ranked list of one or more products based on at least one of a confidence score, the post transaction action application 258 may transmit via the network 201, said ranked list to the user system 204. In some embodiments, the user 202 may choose one or more products associated with one or more receipts from transactions between the user 202 and one or more merchants, from the ranked list for at least one of a post transaction action. In some embodiments, the post transaction action may be handled by the POT 206 of the one or more merchants identified. In some other embodiments, the post transaction action may be handled at the merchant POT system 206 of the one or more merchants identified at multiple other locations.

In response to handling a post transaction action, the user 202 may receive a receipt for at least one of the post transaction action. The user system 204 may then transmit the receipt, via the network 201, to the financial server 208, to be received by the receipt collection application 256. In response to receiving the receipt, the receipt collection application 256 may store in data storage 252, the receipt for the post transaction action between the user 202 and the merchant with the receipt for the transaction between the user 202 and the merchant.

FIG. 2 also illustrates a user system 204. The user system 204 generally comprises a communication device 212, a processing device 214, a global positioning device 216 and a memory device 218. The user system 204 is a computing system that may allow a user 202 to enter into transactions, via a network 201, with the POT system 206. Further, the user system 204 may allow the user 202 to access applications such as a post transaction action application 224 to initiate the process of predictive geo-location based receipt retrieval for post transaction action, via the network 201, with the financial institution server 208. The processing device 214 is operatively coupled to the communication device 212 and the memory device 216. The processing device 214 uses the communication device 212 to communicate with the network 201 and other devices on the network 201, such as, but not limited to the POT system 206, and the financial institution server 208. As such, the communication device 212 generally comprises a modem, server, or other device for communicating with other devices on the network 201. The global positioning device 216 may receive global positioning system (GPS) signals for the purpose of determining the current location of the user 202. In one aspect, the global positioning device 216 in the user system 204 may be used to transmit, via the network 201, the geographic location of the user 202, when the post transaction action application 224 is initiated.

As further illustrated in FIG. 2, the user system 204 comprises computer-readable instructions 222 and data storage 220 stored in the memory device 218, which in one embodiment includes the computer-readable instructions 222 of a user payment application 226. In this way, a user 202 may use the user payment application 226 to be able to enter into transactions at the POT system 206, provide rules inputs for transactions, provided notification responses for selecting a payment vehicle for a transaction, and/or confirm selected payment vehicles through the financial institution server 208. Further, the user system 204 comprises computer readable instructions 222 and data storage 220 store in memory device 218, which in other embodiments includes the computer-readable instructions 222 of a post transaction action application 224. In this way, the user 202 may be able to initiate the application and access the financial institution server 208 for predictive geo-location based receipt retrieval for post transaction actions. The user system 204 may be, for example, a desktop personal computer, a mobile system, such as a cellular phone, smart phone, personal data assistant (PDA), laptop, or the like. Although only a single user system 204 is depicted in FIG. 2, the payment account determination system environment 200 may contain numerous user systems 204.

As illustrated in FIG. 2, the POT system 206 generally comprises a reading device 235, a communication device 236, a processing device 238, and a memory device 240. The reading device 235 is operatively coupled to the processing device 238, communication device 236, and the memory device 240. The POT system 206 may include a reader device 235 to receive payment vehicle information from the user 202 through the user system 204 and/or other payment devices. Such a reader device 235 may include a magnetic strip reader, a barcode scanner, a radio frequency (RF) reader, a character recognition device, a magnetic ink reader, a processor for interpreting codes presented over an electrical or optical medium, a biometric reader, a wireless receiving device, and/or the like. In some embodiments, the reading device 235 receives information that may be used to identify the consumer's payment vehicle, and/or transaction data at the POT system 206 and communicates the information via the communication device 236 over a network 201, to other systems such as, but not limited to the financial institution server 208, and/or the user system 204. As such, the communication device 236 generally comprises a modem, server, or other device for communicating with other devices on the network 201.

As further illustrated in FIG. 2, the POT system 206 comprises computer-readable instructions 242 stored in the memory device 240, which in one embodiment includes the computer-readable instructions 242 of a merchant payment application 244. The merchant payment application 244 may allow a user 202 to return products to the merchant by presenting a receipt for the transaction associated with that product.

It is understood that the servers, systems, and devices described herein illustrate one embodiment of the invention. It is further understood that one or more of the servers, systems, and devices can be combined in other embodiments and still function in the same or similar way as the embodiments described herein.

FIG. 3 illustrates a process map for the logic element associated with the predictive geo-location based receipt retrieval for post transaction action 300, in accordance with one embodiment of the present invention. First, as illustrated in block 302 the process 300 may be activated when a user 202 enrolls in the process 300. The user 202 may be able to enroll in the program by selecting a link provided by the financial institution to download an application on the user system 204 or to enroll through an online banking application provided by the financial institution.

Next, as illustrated in block 304 the user 202 may initiate the system by launching the application on a computing device with a network connectivity capability, such as the user system 204. In some embodiments, the computing device may be a financial transaction system 208 available at the user's location. In response to initiation, as shown in block 306, the system may receive an indication of the geographic location of the user 202. In some embodiments, the geographic location may be a geo-location parameter. In some other embodiments, the geographic location may be a geo-fence, generating a virtual perimeter around a geographic area. The geo-fence parameters are typically formed by monitoring the positions of a trackable (e.g., GPS-equipped) device inside or outside the fenced-in area, and determining if the device crossed the fence. Typically, the mobile device used to launch the post transaction application is equipped with a GPS device capable of location tracking.

In response to receiving the geographic location of the user 202, as illustrated in block 308, the system may identify one or more merchants relative in location to the geographic location of the user 202. In some embodiments, two or more merchants may be involved in a in the same geographic location. In some embodiments, the two or more merchants involved in the SWAS agreement may share one or more points of transaction. As such, some times more than one merchant may have the same geo-fence parameter.

Next, as illustrated in block 310, the system may retrieve one or more receipts for transactions between the user 202 and the one or more merchants identified. In some embodiments, the system may retrieve one or more receipts for transactions between the user 202 and the one or more merchants identified at multiple other transactions. In response to retrieving one or more receipts, as illustrated in block 312, the system may retrieve one or more products from the one or more receipts for transactions between the user 202 and the one or more merchants identified.

In response to retrieving the one or more products, as illustrated in block 314, the system may determine at least one post transaction action for the one or more products based on at least one of a post transaction action policy associated with the one or more products. In some embodiments, the post transaction action may include a product return service. In some embodiments, the post transaction action may include a warranty service. In some other embodiments, post transaction action may include a product upgrade service.

Next, as illustrated in block 316, the system may determine a confidence score associated with one or more products identified, predicting the possibility of post transaction action. The level of confidence of the confidence score may indicate the probability that the one or more products may be associated with at least one of a post transaction action. In some embodiments, the value may be represented by a percentage.

For example, the user may have purchased products P1, P2, P3 and P4 from Merchant 1 at Location 1. After initial use (say 30 days), the user may be unsatisfied with the performance of the product P1, P2, P3, and P4 and may decide to return it. The product return policy for products P1 and P2 states that P1 and P2 may be returned before 90 days from the date of the purchase, and for products P3 and P4, the product return policy may state that the P3 and P4 may be returned before 15 days from the date of the purchase. In such cases, the system may determine a high confidence score for products P1 and P2 and a low confidence score for products P3 and P4 for post transaction return. In the same example, product P3 may still be under warranty. In such cases, the system may determine a high confidence score for product P3 for post transaction warranty service. In the same example, the user may have an upgrade offer for product P4. In such cases, the system may determine a high confidence score for product P4 for post transaction upgrade service.

In response to determining a confidence score, as illustrated in block 318, the system may rank the one or more products from the highest confidence score to the lowest confidence score. In some embodiments, one or more products that may not be associated with a post transaction action policy may be represented with a low confidence score. In some other embodiments, the one or more products that may not be associated with a post transaction action policy may be completely omitted from the list. Finally, as illustrated in block 320, the ranked list may be presented to the user for further action.

In some embodiments, the user 202 may "flag" or manually indicate one or more products for at least one of a post transaction action from the ranked list. In response handling a post transaction action, the user 202 may receive from merchant, a receipt for a post transaction action between the user 202 and the merchant to be stored with the receipt for transaction between the user 202 and the merchant.

FIG. 4a and FIG. 4b depict embodiments of the ranked list 400 of one or more products associated with one or more merchants identified, as presented to the user 202. In some embodiments, as illustrated in FIG. 4a the user may receive a primary list 402 of one or more merchants 406 and one or more receipts 407 for transactions between the user 202 and the one or more merchants 406. The user 202 may choose from the primary list 402, one or more merchants 406 to handle a post transaction action. In response to choosing the one or more merchants 406, the user 202 may select the one or more receipts 407 for transactions between the user 202 and the one or more merchants 406. In an example embodiment, as illustrated in FIG. 4b, in response to selecting a receipt 410, the user 202 may be presented with a secondary list 404, wherein the secondary list 404 may present a list of one or more products 412 associated with the receipt selected 410, and may have one or more post transaction action 414 associated with the one or more products 412. Further, the one or more post transaction action 414 associated with the one or more products 412, may be associated with a confidence score (C-score) 416. The user 202 may "flag" or manually indicate the one or more products 412 for at least one of a post transaction action 414 based on the C-score 416 presented.

FIG. 5 illustrates a flow chart of the user 202 accessing the post transaction action application 500, in accordance with one embodiment of the present invention. The application may be initiated by the user 202 using a user system 204. In response the initiation, the system checks for user 202 enrollment in the process, as illustrated in block 504. A positive response to user 202 enrollment may prompt the application to receive the current geographic location of the user 202, as illustrated in 506. On the other hand, a negative response may prompt the system offer the user 202 to sign up for the post transaction action process to take full advantage of the application, as illustrated in block 508. If the user 202 chooses to sign up for the process 500, the system may receive the current geographic location of the user 202. On the other hand, if the user 202 chooses not to sign up for the application, the system may end the process 500, as illustrated in 502. In response to receiving the current geographic location of the user 202, the system may present one or more merchants relative in location to the geographic location of the user 202, as illustrated in block 512. The user 202 may identify a merchant to handle a post transaction action such as product return services, product refund services, product warranty services, or the like, as illustrated in decision block 514. If the user 202 does not identify a merchant from the one or more merchants listed, the system may receive the current geographic location of the user 202, as illustrated in block 516, in an attempt to provide the most suitable results.

In response to the user 202 identifying the merchant, the system may then retrieve one or more receipts for transactions between the user 202 and the merchant identified and present it to the user 202, as illustrated in block 516. The user 202 may identify a receipt from the one or more receipts provided, as illustrated in decision block 518. If the user 202 does not identify a receipt in decision block 518, the system may update the one or more receipts for transactions between the user 202 and the merchant identified and attempt to present an updated list to the user 202, as illustrated in block 516. In response to the user 202 identifying a receipt, the system may retrieve one or more products associated with the receipt identified and present it to the user 202, as illustrated by block 520. The user 202 may identify one or more products from the receipt to handle a post transaction action, as illustrated by the block 522. If the user 202 does not identify one or more products from the receipt, the system may present the one or more receipts again for the user 202 to choose another receipt. The user may then "flag" or manually indicate one or more products intended for at least one of a post transaction action, as illustrated by 524.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more general-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for predictive receipt retrieval for product returns, the system comprising:
    at least one memory device with computer-readable program code stored thereon;
    at least one communication device comprising a location determining device and at least one local memory device;
    at least one processing device operatively coupled to the at least one memory device and the at least one communication device;
    a post transaction application routine stored in the at least one memory and operatively coupled to the at least one communication device, comprising instruction code that is executable by the at least one processing device, and configured to:
        receive an indication of a transaction being completed between a user and a merchant;
        initiate a request to receive a receipt associated with the transaction from the merchant;
        receive the receipt from the transaction between the user and the merchant based on at least the received request; and
        store the receipt received from the transaction in a financial institution database;
    an application initiation routine stored in the at least one local memory device and operatively coupled to the location determining device associated with the communication device, comprising instruction code that is executable by the at least one processing device, and configured to:
        receive an indication from the user to initiate a post transaction application;
        determine that the user has previously enrolled in the post transaction application based on at least receiving the indication from the user to initiate the post transaction application;
        receive a geographic location of the user using the location determining device based on at least determining that the user has previously enrolled in the post transaction application;
        identify one or more merchants relative in location to the geographic location of the user based at least in part on the geographic location of the user, wherein identifying further comprises determining that the user has transacted with the identified one or more merchants located in a geographic location relative in location to the geographic location of the user and at other locations of the identified one or more merchants, wherein the other locations are not in the geographic location relative in location to the geographic location of the user;
        retrieve one or more receipts from transactions between the user and the one or more identified merchants relative in location to the geographic location of the user and the same one or more merchants identified at the other locations;
        initiate presentation of the one or more retrieved receipts on the communication device of the user;
        receive a user selection of at least one of the one or more retrieved receipts using the communication device of the user;
        identify one or more products of the transactions between the one or more identified merchants and the user based at least in part on the retrieved receipts selected by the user from transactions between the one or more identified merchants and the user;
        determine if the one or more products identified can be associated with a post transaction action based on at least one of a post transaction policy associated with the one or more products identified;
        determine a confidence score for the one or more products identified, wherein the confidence score predicts the possibility of post transaction action, wherein determining the confidence score comprises ranking the one or more products identified from a high confidence score to a low confidence score, wherein the one or more products with the high confidence score are able to be part of the post transaction action, wherein determining a confidence score includes geographic location of the user, merchant identification, merchant post transaction action policy, and product information; and present list of one or more products identified in order of categorization to the user.

2. The system of claim 1, wherein identifying one or more products of the transaction further comprises identifying:

product information, wherein product information comprises a stock-keeping unit (SKU) number and post transaction action policy;

merchant information, wherein merchant information comprises merchant name and merchant location; or transaction information, wherein transaction information comprises transaction amount.

3. The system of claim 1, wherein identifying one or more merchants relative in location to the geographic location of the user is based on received receipts for the transactions between the user and the one or more merchants identified.

4. The system of claim 1, wherein the geographic location of the user is determined by a geo-location parameter, wherein the geo-location parameters comprise a geo-fence defining a virtual perimeter around a geographic location.

5. The system of claim 3, wherein retrieving receipts from transactions between one or more merchants identified further comprises:

identify one or more merchants relative in location to the geographic location of the user;

determine that the user has not transacted with the one or more merchants relative in location to the geographic location of the user;

determine if the user has transacted with the same one or more merchants identified at other locations; and identify one or more products of the transactions between the user and the same one or more merchants identified at other locations.

6. The system of claim 1, further comprising storing the receipt from the one or more post transaction actions with the receipt from transactions between the user and the one or more merchants identified.

7. The system of claim 1, further comprising categorizing the one or more identified products based at least in part on the confidence score predicting the possibility of potential post transaction action further comprises ranking the products from the highest confidence score to the lowest confidence score.

8. A computer program product for predictive receipt retrieval for product returns, the computer program product comprising at least one non-transitory computer-readable medium having computer-readable program code portions embodied therein, the computer-readable program code portions comprising:

an executable portion configured for receiving an indication of a transaction being completed between a user and a merchant;

an executable portion configured for initiating a request to receive a receipt associated with the transaction from the merchant;

an executable portion configured for receiving the receipt from the transaction between the user and the merchant based on at least the received request;

an executable portion configured for storing the receipt received from the transaction in a financial institution database;

an executable portion configured for receiving an indication from the user to initiate a post transaction application;

an executable portion configured for determining that the user has previously enrolled in the post transaction application based on at least receiving the indication from the user to initiate the post transaction application;

an executable portion configured for receiving a geographic location of the user based on at least determining that the user has previously enrolled in the post transaction application;

an executable portion configured for identifying one or more merchants relative in location to the geographic location of the user based at least in part on the geographic location of the user, wherein identifying further comprises determining that the user has transacted with the identified one or more merchants located in a geographic location relative in location to the geographic location of the user and at other locations of the identified one or more merchants, wherein the other locations are not in the geographic location relative in location to the geographic location of the user;

an executable portion configured for retrieving one or more receipts from transactions between the user and the one or more identified merchants relative in location to the geographic location of the user and the same one or more merchants identified at the other locations;

an executable portion configured for initiating presentation of the one or more retrieved receipts on the communication device of the user;

an executable portion configured for receiving a user selection of at least one of the one or more retrieved receipts using the communication device of the user;

an executable portion configured for identifying one or more products of the transactions between the one or more identified merchants and the user based at least in part on the retrieved receipts selected by the user from transactions between the one or more identified merchants and the user;

an executable portion configured for determining if the one or more products identified can be associated with a post transaction action based on at least one of a post transaction policy associated with the one or more products identified;

an executable portion configured for determining a confidence score for the one or more products identified, wherein the confidence score predicts the possibility of post transaction action, wherein determining the confidence score comprises ranking the one or more products identified from a high confidence score to a low confidence score, wherein the one or more products with the high confidence score are able to be part of the post transaction action, wherein determining a confidence score includes geographic location of the user, merchant identification, merchant post transaction action policy, and product information; and an executable portion configured for presenting list of one or more products identified in order of categorization to the user.

9. The computer program product as defined in claim 8, wherein identifying one or more products of the transaction further comprises identifying:

product information, wherein product information comprises a stock-keeping unit (SKU) number and post transaction action policy;
merchant information, wherein merchant information comprises merchant name and merchant location; or
transaction information, wherein transaction information comprises transaction amount.

10. The computer program product as defined in claim 8, wherein identifying one or more merchants relative in location to the geographic location of the user is based on received receipts for the transactions between the user and the one or more merchants identified.

11. The computer program product as defined in claim 8, wherein the geographic location of the user is determined by a geo-location parameter, wherein the geo-location parameters comprise a geo-fence defining a virtual perimeter around a geographic location.

12. The computer program product as defined in claim 10, wherein retrieving receipts from transactions between one or more merchants identified further comprises:
identify one or more merchants relative in location to the geographic location of the user;
determine that the user has not transacted with the one or more merchants relative in location to the geographic location of the user;
determine if the user has transacted with the same one or more merchants identified at other locations; and
identify one or more products of the transactions between the user and the same one or more merchants identified at other locations.

13. The computer program product as defined in claim 8, further comprising an executable portion configured for categorizing the one or more identified products based at least in part on the confidence score predicting the possibility of potential post transaction action further comprises ranking the products from the highest confidence score to the lowest confidence score.

14. A computer-implemented method for predictive receipt retrieval for product returns, the method comprising:
receiving an indication of a transaction being completed between a user and a merchant;
initiating a request to receive a receipt associated with the transaction from the merchant;
receiving the receipt from the transaction between the user and the merchant based on at least the received request;
storing the receipt received from the transaction in a financial institution database;
receiving an indication from the user to initiate a post transaction application;
determining that the user has previously enrolled in the post transaction application based on at least receiving the indication from the user to initiate the post transaction application;
receiving a geographic location of the user based on at least determining that the user has previously enrolled in the post transaction application;
identifying one or more merchants relative in location to the geographic location of the user based at least in part on the geographic location of the user, wherein identifying further comprises determining that the user has transacted with the identified one or more merchants located in a geographic location relative in location to the geographic location of the user and at other locations of the identified one or more merchants, wherein the other locations are not in the geographic location relative in location to the geographic location of the user;
retrieving one or more receipts from transactions between the user and the one or more identified merchants relative in location to the geographic location of the user and the same one or more merchants identified at the other locations;
initiating presentation of the one or more retrieved receipts on the communication device of the user;
receiving a user selection of at least one of the one or more retrieved receipts using the communication device of the user;
identifying one or more products of the transactions between the one or more identified merchants and the user based at least in part on the retrieved receipts selected by the user from transactions between the one or more identified merchants and the user;
determining if the one or more products identified can be associated with a post transaction action based on at least one of a post transaction policy associated with the one or more products identified;
determining a confidence score for the one or more products identified, wherein the confidence score predicts the possibility of post transaction action, wherein determining the confidence score comprises ranking the one or more products identified from a high confidence score to a low confidence score, wherein the one or more products with the high confidence score are able to be part of the post transaction action, wherein determining a confidence score includes geographic location of the user, merchant identification, merchant post transaction action policy, and product information; and
presenting list of one or more products identified in order of categorization to the user.

15. The computer-implemented method of claim 14, wherein identifying one or more products of the transaction further comprises identifying:
product information, wherein product information comprises a stock-keeping unit (SKU) number and post transaction action policy;
merchant information, wherein merchant information comprises merchant name and merchant location; or
transaction information, wherein transaction information comprises transaction amount.

16. The computer-implemented method of claim 14, wherein identifying one or more merchants relative in location to the geographic location of the user is based on received receipts for the transactions between the user and the one or more merchants identified.

17. The computer-implemented method of claim 14, wherein the geographic location of the user is determined by a geo-location parameter, wherein the geo-location parameters comprise a geo-fence defining a virtual perimeter around a geographic location.

18. The computer-implemented method of claim 16, wherein retrieving receipts from transactions between one or more merchants identified further comprises:
identify one or more merchants relative in location to the geographic location of the user;
determine that the user has not transacted with the one or more merchants relative in location to the geographic location of the user;
determine if the user has transacted with the same one or more merchants identified at other locations; and
identify one or more products of the transactions between the user and the same one or more merchants identified at other locations.

19. The computer-implemented method of claim 14 further comprising, storing the receipt from the one or more post transaction actions with the receipt from transactions between the user and the one or more merchants identified.

* * * * *